(12) United States Patent
Carapelli (10) Patent No.: US 10,173,885 B2
(45) Date of Patent: Jan. 8, 2019

(54) FUEL DISPENSER HAVING ACOUSTIC WAVES CORIOLIS FLOW METER

(71) Applicant: Gilbarco Inc., Greensboro, NC (US)

(72) Inventor: Giovanni Carapelli, High Point, NC (US)

(73) Assignee: Gilbarco Inc., Greensboro, NC (US)

( * ) Notice: Subject to any disclaimer, the term of this patent is extended or adjusted under 35 U.S.C. 154(b) by 149 days.

(21) Appl. No.: 15/452,123

(22) Filed: Mar. 7, 2017

(65) Prior Publication Data

US 2017/0253474 A1    Sep. 7, 2017

Related U.S. Application Data

(60) Provisional application No. 62/304,662, filed on Mar. 7, 2016.

(51) Int. Cl.
| | |
|---|---|
| *B67D 7/36* | (2010.01) |
| *B67D 7/08* | (2010.01) |
| *B67D 7/56* | (2010.01) |
| *G01F 1/84* | (2006.01) |

(Continued)

(52) U.S. Cl.
CPC ............. *B67D 7/36* (2013.01); *B67D 7/08* (2013.01); *B67D 7/56* (2013.01); *G01F 1/849* (2013.01); *G01F 15/06* (2013.01); *G05D 7/0635* (2013.01)

(58) Field of Classification Search
CPC .... B67D 7/36; B67D 7/56; B65B 1/04; G01F 1/849
See application file for complete search history.

(56) References Cited

U.S. PATENT DOCUMENTS

| | | |
|---|---|---|
| 3,906,791 A | 9/1975 | Lynnworth |
| 4,109,524 A | 8/1978 | Smith |
| 4,187,721 A | 2/1980 | Smith |

(Continued)

FOREIGN PATENT DOCUMENTS

| | | |
|---|---|---|
| CN | 102374880 A | 3/2012 |
| WO | 2012123673 A1 | 9/2012 |

OTHER PUBLICATIONS

International Search Report and Written Opinion dated May 19, 2017 in corresponding international application serial No. PCT/US2017/021140.

*Primary Examiner* — Jewel V Dowtin
(74) *Attorney, Agent, or Firm* — Nelson Mullins Riley & Scarborough, LLP (57) ABSTRACT

A fuel dispenser comprises a fuel nozzle configured to be connected to a vehicle fuel system. Fuel piping configured to transfer fuel from at least one fuel storage tank associated with the fuel dispenser through the fuel nozzle into the vehicle fuel system is also provided. A flow control valve and a flow measurement device are located along the fuel piping, the flow measurement device having a housing defining a flow path therethrough. The flow measurement device includes a first exciter for producing a first wave in fuel moving along the flow path. A second exciter produces a second wave in the fuel which passes through the first wave, wherein the second wave has a higher frequency than the first wave. At least one sensor is spaced apart from the first exciter and the second exciter, the at least one sensor being configured to detect at least one measurable characteristic of the second wave from which flow rate can be derived.

25 Claims, 7 Drawing Sheets

(51) Int. Cl.
  *G01F 15/06* (2006.01)
  *G05D 7/06* (2006.01)

(56) References Cited

U.S. PATENT DOCUMENTS

| | | | |
|---|---|---|---|
| 4,491,025 | A | 1/1985 | Smith et al. |
| 5,040,577 | A | 8/1991 | Pope |
| 5,135,029 | A * | 8/1992 | Anderson ............... F16L 35/00 137/614.04 |
| 5,345,979 | A * | 9/1994 | Tucker ................. B67D 7/0486 141/1 |
| 5,448,921 | A | 9/1995 | Cage et al. |
| 5,564,471 | A * | 10/1996 | Wilder ................ F16L 55/1015 137/614.04 |
| 5,630,528 | A | 5/1997 | Nanji |
| 5,877,416 | A | 3/1999 | Kapartis |
| 6,164,140 | A | 12/2000 | Kalinoski |
| 6,253,779 | B1 | 7/2001 | Nanji et al. |
| 6,435,204 | B2 | 8/2002 | White et al. |
| 6,935,191 | B2 | 8/2005 | Olivier et al. |
| 7,252,112 | B1 | 8/2007 | Imler et al. |
| 7,287,438 | B2 | 10/2007 | Van Cleve |
| 7,322,245 | B2 | 1/2008 | Gysling et al. |
| 7,472,606 | B2 | 1/2009 | Seddon et al. |
| 8,291,928 | B2 | 10/2012 | Ried et al. |
| 8,342,199 | B2 | 1/2013 | Deline et al. |
| 9,475,687 | B2 | 10/2016 | Deline |
| 9,718,666 | B2 * | 8/2017 | Cornett ................... B67D 7/425 |
| 2004/0006409 | A1 | 1/2004 | Liljenberg et al. |
| 2004/0254462 | A1 | 12/2004 | Kawagishi et al. |
| 2005/0125170 | A1 | 6/2005 | Gysling et al. |
| 2010/0139782 | A1 | 6/2010 | Deline et al. |

* cited by examiner

FUEL DISPENSER HAVING ACOUSTIC WAVES CORIOLIS FLOW METER

PRIORITY CLAIM

This application is based upon and claims the benefit of U.S. provisional application Ser. No. 62/304,662, filed Mar. 7, 2016, incorporated fully herein by reference for all purposes.

FIELD OF THE INVENTION

The present invention relates generally to fuel dispensers. More specifically, the invention provides a fuel dispenser including a device and method for determining the flow rate of a flowing fluid by exciting the fluid in an oscillatory motion by acoustic means.

BACKGROUND OF THE INVENTION

Fuel pumps and fuel dispensers are known in the art. A fuel pump includes a pump located within its housing for extracting fuel from a fuel source, as well as meters for measuring fuel flow and switches and valves for controlling fuel flow. A fuel dispenser, in contrast, is connected to a source of fuel which contains its own pump, typically an underground storage tank (UST) with a submersible turbine pump (STP). Thus, a fuel dispenser does not typically require that a pump be housed in the unit itself. Instead, the dispenser housing contains the appropriate meters, switches and valves for controlling fuel flow supplied to it under pressure. As used herein, the term "fuel dispenser" shall include both fuel pumps and fuel dispensers, unless the context clearly indicates otherwise.

Fuel dispensers are designed in a variety of different configurations. A common type of fuel dispenser, often called a "lane-oriented" dispenser, has one or more fuel dispensing nozzles on each side of the unit. A lane-oriented multiproduct fuel dispenser typically has two or more fuel dispensing nozzles on each side of the unit. Each of the nozzles on each side of the unit is typically used to dispense a particular grade (e.g., octane level) of fuel. Alternatively, a single nozzle may be provided for dispensing multiple grades of fuel depending on the customer's selection. Each side of the unit generally includes a display for displaying the amount and cost of the fuel dispensed, and can also include credit or debit card verification and cash acceptance mechanisms.

A variety of different meters have been used in prior art fuel dispensers. Typically, either positive displacement meters or inferential meters have been used for this purpose. For a variety of reasons, fuel volume or flow rate measurement technologies are typically limited in their measurement accuracies across a finite range of flow rates. Additionally, measurement technologies may be limited in their maximum flow rates at the desired, restricted-to and/or otherwise realistic operating pressures by internal restrictions or fluidic impedances including but not limited to bore, port or other orifice size. Moreover, these measurement technologies require periodic recalibration and/or special filters.

Flow meters utilizing the Coriolis Effect to measure the mass flow rate of a fluid are also known. Generally, in such Coriolis meters an electromechanical actuator forces one or more fluid-filled flow conduits to vibrate in a prescribed oscillatory bending-mode of vibration. When the process-fluid is flowing, the combination of fluid motion and conduit vibration causes inertial forces which deflect the conduits away from their normal paths of vibration proportionally related to mass flow rate. Motion of the conduit is measured at specific locations along its length and this information is used to determine mass flow. Detailed information on the structure and operation of traditional Coriolis flow meters is disclosed in U.S. Pat. Nos. 7,287,438 and 7,472,606, both of which are incorporated herein by reference in their entireties for all purposes.

Coriolis flow meters utilize the acceleration effects that govern a mass moving relative to a noninertial, or rotating, frame of reference. For example, consider a fluid particle moving with a velocity v in a fluid stream in a conduit where the conduit is oscillated about an axis perpendicular its centerline with an angular velocity $\Omega$. To an observer in the noninertial frame of reference, the particle appears to accelerate. The particle's acceleration, $a_p$, is given by $2 \cdot \Omega \times v$. Thus, the apparent force, $F_c$, exerted on the particle is:

$$F_c = m_p \cdot a_p = 2 \cdot m_p \Omega \times v$$

where $m_p$ is the particle's mass and x is the vector cross product operator. The Coriolis force acts in a direction perpendicular to both the particle's linear and angular velocities. Because the force is proportional to the particle's mass and velocity, measurement of the force's effect on the conduit allows the mass flow rate of the fluid to be determined.

Current Coriolis mass flow technology has several desirable characteristics over positive displacement and inferential flow meters. For instance, Coriolis meters are highly accurate, they are not subject to wear or meter drift because they lack internal moving parts, they can measure flow in forward and backward directions, and they measure fluid mass directly. Some implementations also measure fluid density directly.

However, although Coriolis meters have been widely used in some industries, they have not been widely adopted in the fuel dispensing industry because of several drawbacks. For example, current implementations are expensive and complex. Limits of current Coriolis meters may also constrain the diameter size, thickness, and/or overall geometry of a flow conduit.

Therefore, room remains in the flow measurement art for a flow meter that utilizes the Coriolis Effect to achieve a highly accurate measurement of mass flow while overcoming the above difficulties. In particular, a flow meter that does not require excitation of the flow conduit could have a less complex geometry, fewer moving parts, and be more readily implemented in a flow to be measured.

SUMMARY OF THE INVENTION

According to one aspect, the present invention provides a fuel dispenser comprising a fuel nozzle configured to be connected to a vehicle fuel system. Fuel piping configured to transfer fuel from at least one fuel storage tank associated with the fuel dispenser through the fuel nozzle into the vehicle fuel system is also provided. A flow control valve and a flow measurement device are located along the fuel piping, the flow measurement device having a housing defining a flow path therethrough. The flow measurement device includes a first exciter for producing a first wave in fuel moving along the flow path. A second exciter produces a second wave in the fuel which passes through the first wave, wherein the second wave has a higher frequency than the first wave. At least one sensor is spaced apart from the first exciter and the second exciter, the at least one sensor being configured to detect at least one measurable characteristic of the second wave from which flow rate can be derived.

Another aspect of the invention provides a flow measurement device for determining the mass flow rate of a fluid flowing in a conduit. The flow measurement device comprises a first exciter for producing a first wave in the fluid and a second exciter for producing a second wave in the fluid passing through the first wave. The second wave has a higher frequency than the first wave. The first wave causes a change in at least one measurable characteristic of the second wave. The flow measurement device also comprises a sensor array downstream of the first and second exciters configured to detect the at least one measurable characteristic of the second wave. The flow measurement device further comprises a processor in electronic communication with the sensor array to receive signals representative of the at least one measurable characteristic of the second wave, and the processor is configured to calculate the mass flow rate of the fluid.

Thus, embodiments of the present invention provide a novel flow measurement system using Coriolis accelerations caused by the acoustic displacement of the fluid to be measured. As explained below, in contrast to traditional Coriolis flow meters, preferably few or no moving parts are required to generate Coriolis forces acting on the fluid. It will be appreciated that this may increase the reliability of the measurement system. Additionally, many embodiments of the present invention may comprise a much smaller form factor than currently-available Coriolis meters. Further, microelectromechanical systems (MEMS) may be used to implement at least some of the components of the present invention, which may reduce the cost of the measurement system.

BRIEF DESCRIPTION OF THE DRAWINGS

A full and enabling disclosure of the present invention, including the best mode thereof directed to one of ordinary skill in the art, is set forth in the specification, which makes reference to the appended drawings, in which.

Repeat use of reference characters in the present specification and drawings is intended to represent same or analogous features or elements of the invention.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Figure 1:
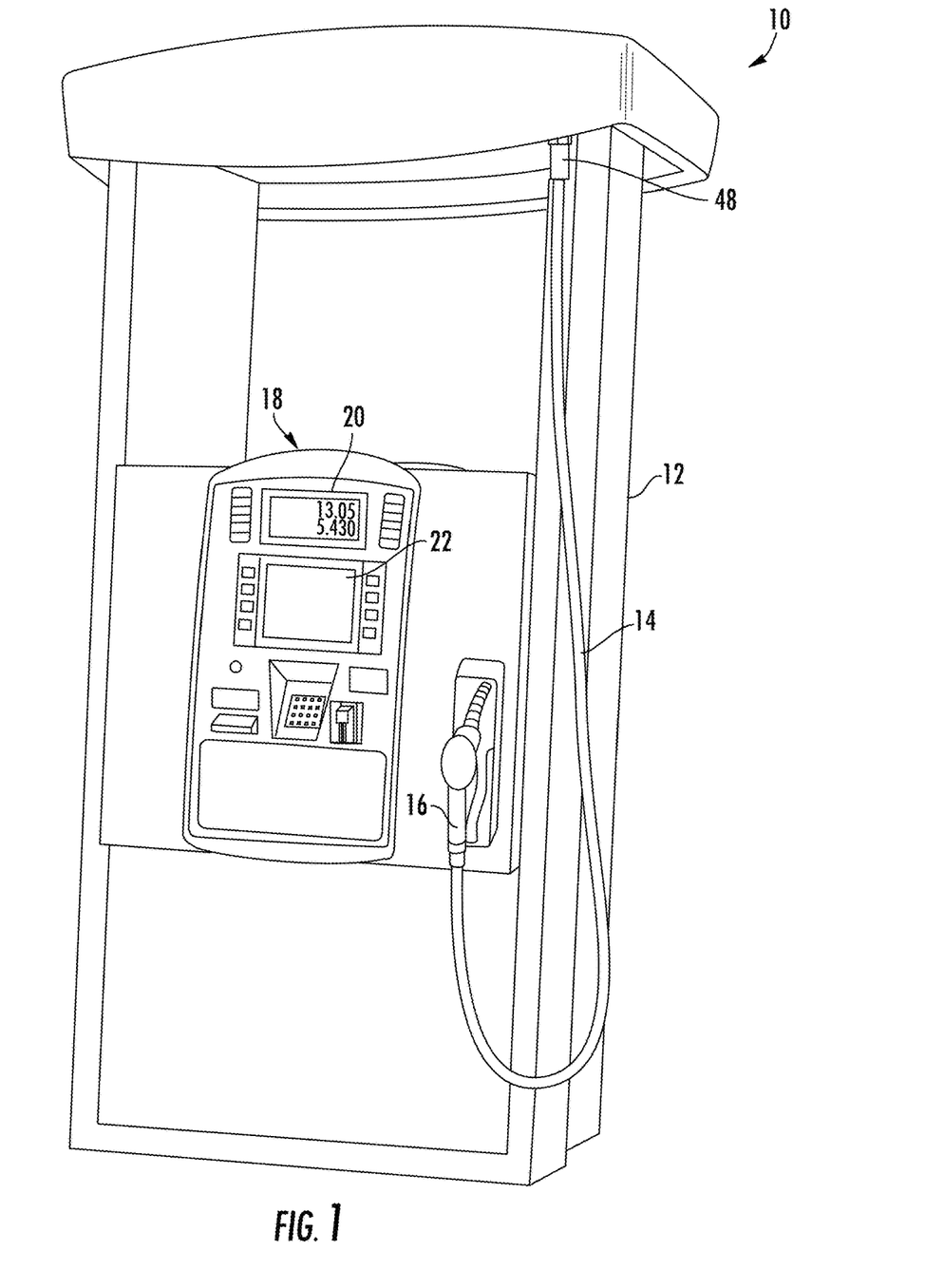
FIG. 1 illustrates a perspective view of an exemplary fuel dispenser in accordance with an embodiment of the present invention.

FIG. 1 is a perspective view of an exemplary fuel dispenser 10 according to an embodiment of the present invention. Fuel dispenser 10 includes a housing 12 with a flexible fuel hose 14 extending therefrom. Fuel hose 14 terminates in a fuel nozzle 16 adapted to be inserted into a fill neck of a vehicle's fuel tank. Fuel nozzle 16 includes a manually-operated fuel valve. Various fuel handling components, such as valves and meters, are also located inside of housing 12. These fuel handling components allow fuel to be received from underground piping and delivered through fuel hose 14 and fuel nozzle 16 to a vehicle's fuel system, e.g. fuel tank.

Fuel dispenser 10 has a customer interface 18. Customer interface 18 may include an information display 20 relating to an ongoing fueling transaction that includes the amount of fuel dispensed and the price of the dispensed fuel. Further, customer interface 18 may include a display 22 that provides instructions to the customer regarding the fueling transaction. Display 22 may also provide advertising, merchandising, and multimedia presentations to a customer, and may allow the customer to purchase goods and services other than fuel at the dispenser.

Figure 2:
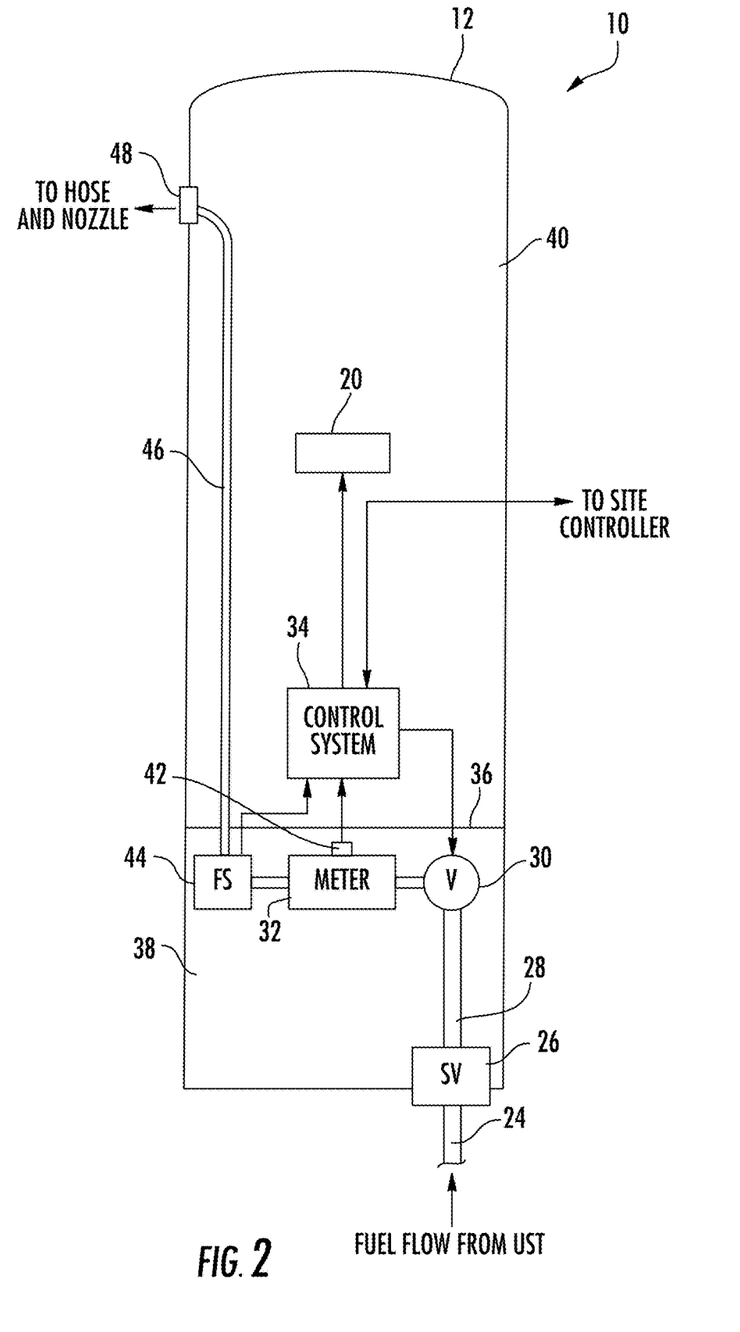
FIG. 2 illustrates a diagrammatic representation of internal components of the fuel dispenser of FIG. 1 according to an embodiment of the present invention.

FIG. 2 is a schematic illustration of internal fuel flow components of fuel dispenser 10 according to an embodiment of the present invention. In general, fuel of a particular grade or type may travel from an underground storage tank (UST) via main fuel piping 24, which may be a double-walled pipe having secondary containment as is well known, to fuel dispenser 10 and nozzle 16 for delivery. An exemplary underground fuel delivery system is illustrated in U.S. Pat. No. 6,435,204, hereby incorporated by reference in its entirety for all purposes. More specifically, a submersible turbine pump (STP) associated with the UST is used to pump fuel to the fuel dispenser 10. However, some fuel dispensers may be self-contained, meaning fuel is drawn to the fuel dispenser 10 by a pump unit positioned within housing 12.

Main fuel piping 24 passes into housing 12 through a shear valve 26. As is well known, shear valve 26 is designed to close the fuel flow path in the event of an impact to fuel dispenser 10. U.S. Pat. No. 8,291,928, hereby incorporated by reference in its entirety for all purposes, discloses an exemplary secondarily-contained shear valve adapted for use in service station environments. Shear valve 26 contains an internal fuel flow path to carry fuel from main fuel piping 24 to internal fuel piping 28.

Fuel from the shear valve 26 flows toward a flow control valve 30 positioned upstream of a flow meter 32. Alternatively, flow control valve 30 may be positioned downstream of the flow meter 32. In one embodiment, flow control valve 30 may be a proportional solenoid controlled valve.

Flow control valve 30 is under control of a control system 34. In this manner, control system 34 can control the opening and closing of flow control valve 30 to either allow fuel to flow or not flow through meter 32 and on to the hose 14 and nozzle 16. Control system 34 may comprise any suitable electronics with associated memory and software programs running thereon whether referred to as a processor, microprocessor, controller, microcontroller, or the like. In a preferred embodiment, control system 34 may be comparable to the microprocessor-based control systems used in CRIND (card reader in dispenser) type units sold by Gilbarco Inc. Control system 34 typically controls other aspects of fuel dispenser 10, such as other valves, displays, and the like. For example, control system 34 typically instructs flow control valve 30 to open when a fueling transaction is authorized. In addition, control system 34 may be in electronic communication with a point-of sale system (site controller) located at the fueling site. The site controller communicates with control system 34 to control authorization of fueling transactions and other conventional activities.

A vapor barrier 36 delimits hydraulics compartment 38 of fuel dispenser 10, and control system 34 is located in electronics compartment 40 above vapor barrier 36. Fluid handling components, such as flow meter 32, are located in hydraulics compartment 38. Meter 32 typically comprises electronics 42 that communicates information representative of the flow rate or volume to control system 34. In this manner, control system 34 can update the total gallons (or liters) dispensed and the price of the fuel dispensed on information display 20.

As fuel leaves flow meter 32 it enters a flow switch 44, which preferably comprises a one-way check valve that prevents rearward flow through fuel dispenser 10. Flow switch 44 provides a flow switch communication signal to control system 34 when fuel is flowing through flow meter 32. The flow switch communication signal indicates to control system 34 that fuel is actually flowing in the fuel delivery path. Fuel from flow switch 44 exits through internal fuel piping 46 to fuel hose 14 and nozzle 16 for delivery to the customer's vehicle.

In an example embodiment, a breakaway device 48 may connect the internal piping 46 to the hose 14. The breakaway device 48 may be configured to detach from the dispenser 10 and/or internal piping 46 in response to a force applied to the breakaway device 48 exceeding a predetermined threshold, for example 100 lbs or more. An example of a suitable breakaway device 48 is disclosed in U.S. Pat. No. 7,252,112, incorporated by reference herein in its entirety for all purposes.

A blend manifold may also be provided downstream of flow switch 44. The blend manifold receives fuels of varying octane levels from the various USTs and ensures that fuel of the octane level selected by the customer is delivered. In addition, fuel dispenser 10 may comprise a vapor recovery system to recover fuel vapors through nozzle 16 and hose 14 to return to the UST. An example of a vapor recovery assist equipped fuel dispenser is disclosed in U.S. Pat. No. 5,040,577, incorporated by reference herein in its entirety for all purposes.

According to an embodiment of the present invention, flow meter 32 is configured to measure fluid flow characteristics based on noninertial frame of reference acceleration effects on an excited fluid stream flowing in a conduit. Thus, unlike traditional Coriolis flow meters, which rely on physical displacement of a fluid conduit, the present invention utilizes excitation of the fluid itself to determine mass flow.

Figure 3A:
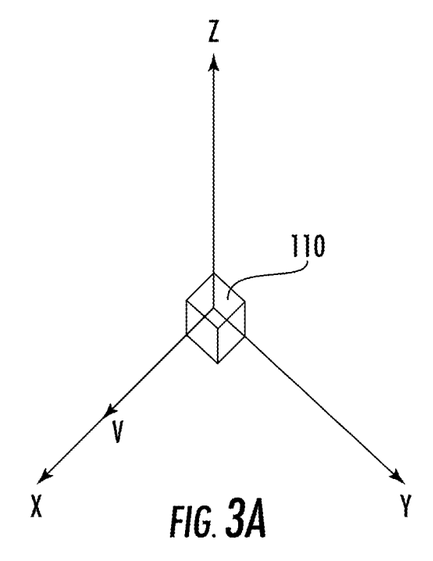
FIG. 3A is a schematic representation of a particle of fluid flowing along a streamline in a fluid conduit.
Figure 3B:
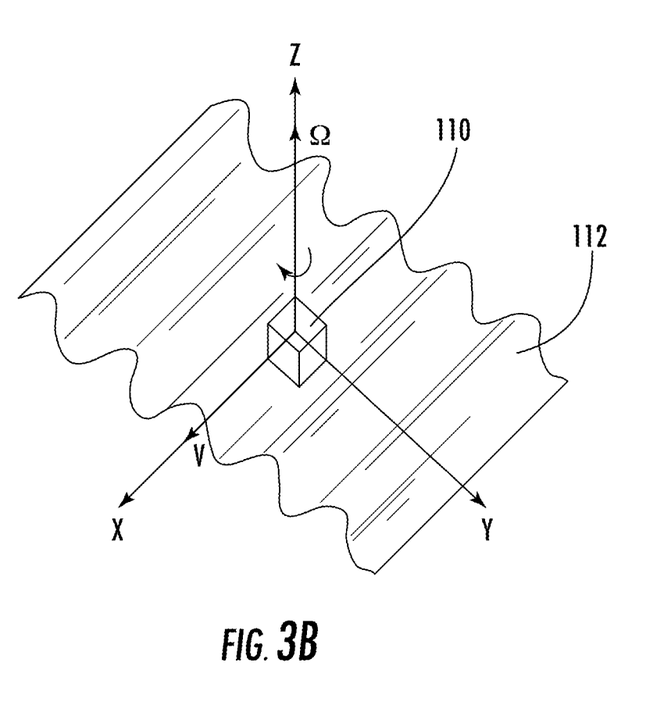
FIG. 3B is a schematic representation of the fluid particle of FIG. 3A in the presence of an acoustic wave, wherein the wave oscillates in a direction orthogonal to the flow direction.

To create a moving frame of reference and induce inertial forces in a notionally uniform steady, fully-developed, laminar flow, embodiments of the present invention may symmetrically and rapidly excite a "column" of the flowing fluid in a measurement cell coupled to the fluid flow conduit. The general principle of operation is described below in reference to FIGS. 3-4.

FIG. 3A illustrates a particle of fluid 110 flowing along a streamline in a fluid conduit. The motion of particle 110 is best visualized in reference to a set of axes labeled X, Y, and Z. The X axis is parallel to the centerline of the fluid conduit. In the absence of oscillation or excitation, fluid particle 110 flows with velocity vector v in a streamline along the X axis. At this point, there is a substantially uniform pressure distribution in the fluid flow that may be sensed by an array of sensors described below.

In some embodiments of the present invention, an exciter will generate an acoustic wave to oscillate a column of the flowing fluid and thus create a moving frame of reference. Preferably, the acoustic wave is planar, but those of skill in the art will appreciate that this is not required in all embodiments. In this regard, FIG. 3B illustrates the particle 110 in the presence of a planar acoustic wave 112 that oscillates in a direction orthogonal to the flow direction. This causes particle 110 to have an angular velocity about the Z axis, which is represented by the angular velocity vector $\Omega$.

Figure 4:
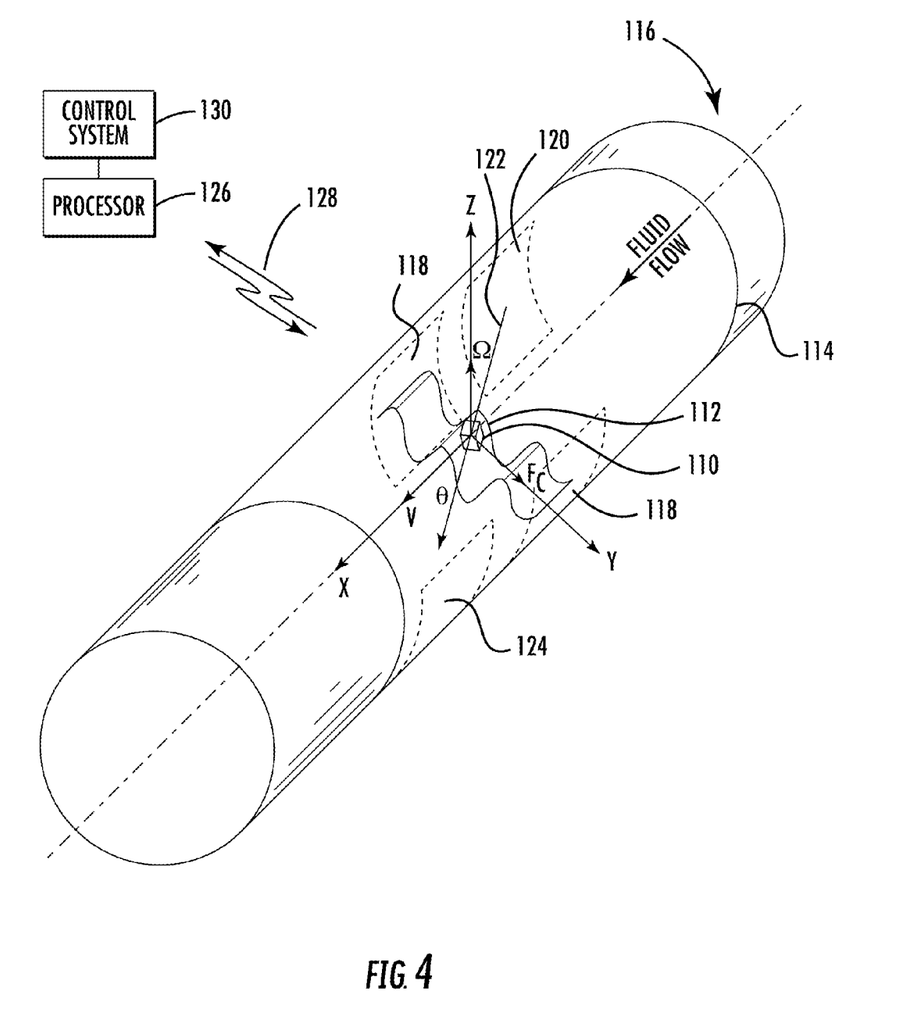
FIG. 4 is a schematic perspective view of a measuring cell coupled to a fluid conduit according to an embodiment of the present invention.

More specifically, FIG. 4 provides a schematic representation of measuring cell 114 coupled to a fluid conduit 116 according to an embodiment of the present invention. Here, a first exciter 118 generates planar acoustic wave 112 at a specific frequency along the Y axis, which is orthogonal to the flow direction. Those of skill in the art are aware that acoustic waves in fluids are longitudinal, meaning the deflected particles move in the direction of the acoustic wave propagation. Passage of the acoustic wave affects the pressure, density, and particle velocity of the fluid. Thus, after the exciter 118 generates the oscillating wave, wave 112 displaces particle 110 radially along the Y axis. Thus, particle 110 rotates about the Z axis as noted above and has angular velocity vector $\Omega$.

The radial movement alters the flow's velocity profile as a function of length of the measuring cell. Further, the movement causes a deviation from the initial, uniform pressure distribution in the measuring cell. Therefore, a rotating frame of reference is created that allows observation of inertial forces acting on particle 110. In this example, the Coriolis force $F_c$ acting on particle 110 will act along the Y axis, perpendicular to both the fluid velocity vector v and the angular velocity vector of oscillation $\Omega$. It can be seen that when the Coriolis forces acting on each deflected particle in a fluid flow are summed, they will create a gradient of measurable pressures acting on the conduit wall.

Additionally, a second exciter 120 is provided to produce a second wave 122 at a higher frequency than the planar wave's frequency. The second wave may preferably be emitted at an angle $\theta$ to the flow and through the column of fluid oscillated by the first wave 112. As is well known, any change in the path through which a wave propagates will result in a change in the wave's characteristics. Thus, the first wave's movement will alter measurable characteristics of the second wave 122 (e.g., frequency, phase, velocity, intensity, etc.). An array of sensors 124 is provided downstream of the first and second exciters to detect variables related to the mass flow rate of the fluid. The sensor array 124 may preferably be implemented using microelectromechanical systems (MEMS). For example, the sensor array 124 may comprise receivers to detect changes to the second wave as the first wave oscillates, such as changes in the second wave's frequency, velocity, and/or intensity. The sensor array 124 may also comprise high-accuracy pressure sensors to detect alterations in fluid pressure.

Then, using the measured variables, a processor 126 may calculate the fluid's mass flow rate. As described in more detail below, the processor may be in electronic communication 128 with the first and second exciters 118, 120 and the sensor array 124. The mass flow rate of a fluid can be written as: $M = m_p \cdot v / l$, where M is the mass flow rate and l is the length of the measurement section. Rewriting the formula for the Coriolis force above yields: $m_p \cdot v = F_c / (2 \cdot \Omega)$. Therefore, by way of substitution, $M = F_c / (2 \cdot \Omega \cdot l)$. As an example, the sensors may detect a change in pressure gradient over the measurement area and determine $F_c$. Plus, because the second wave is at a higher frequency than the first wave, the sensors may detect incremental changes in a fluid velocity vector field to determine $\Omega$. Thus, using the above relationships the processor could calculate the mass flow rate M.

The flow meter of the present invention can be adapted for many different flow measurement applications. For example, it is contemplated that the flow meter could be used in commercial and industrial fluid measurement systems where a high degree of accuracy is required. Although the flow meter may be used to measure many different fluids, the flow meter of the present invention may be particularly suited for measurement of mass flow of liquid fuel, such as but not limited to gasoline, diesel, or ethanol, in a retail fuel dispensing environment. It is contemplated that the present invention could be placed in various locations in a fuel dispensing environment and used with one or more fuel dispensers to facilitate the retail sale of fuel. Fuel dispensing equipment is shown and described in the following U.S. patents, each of which is incorporated herein by reference in its entirety for all purposes: U.S. Pat. Nos. 6,935,191; 6,253,779; and 5,630,528. Additionally, U.S. Pat. No. 8,342,199, entitled "Dispensing Equipment Utilizing Coriolis Flow Meters," issued Jan. 1, 2013, contains information on fuel dispensing equipment utilizing traditional Coriolis flow meters and is incorporated by reference herein in its entirety for all purposes.

Therefore, in an embodiment where the present invention is used in conjunction with a retail fuel dispensing environment, the processor 126 may also calculate the volumetric flow rate of the fluid and the total volume of fluid dispensed in a dispensing transaction. Alternatively, processor 126 may transmit the mass flow rate to a control system 130 (e.g., the control system in a fuel dispenser) for calculation of the volumetric flow rate and total volume dispensed. The density of the fluid may be calculated in a known fashion (e.g., a flow switch (see U.S. Pat. No. 6,935,191) that employs temperature probes in the fluid) so that the volumetric flow rate can be determined using the relationship: $Q = M / \rho$, where Q is the volumetric flow rate and $\rho$ is the fluid density. The processor 126 or control system 130 then preferably displays the volume dispensed for a customer.

Figure 5:
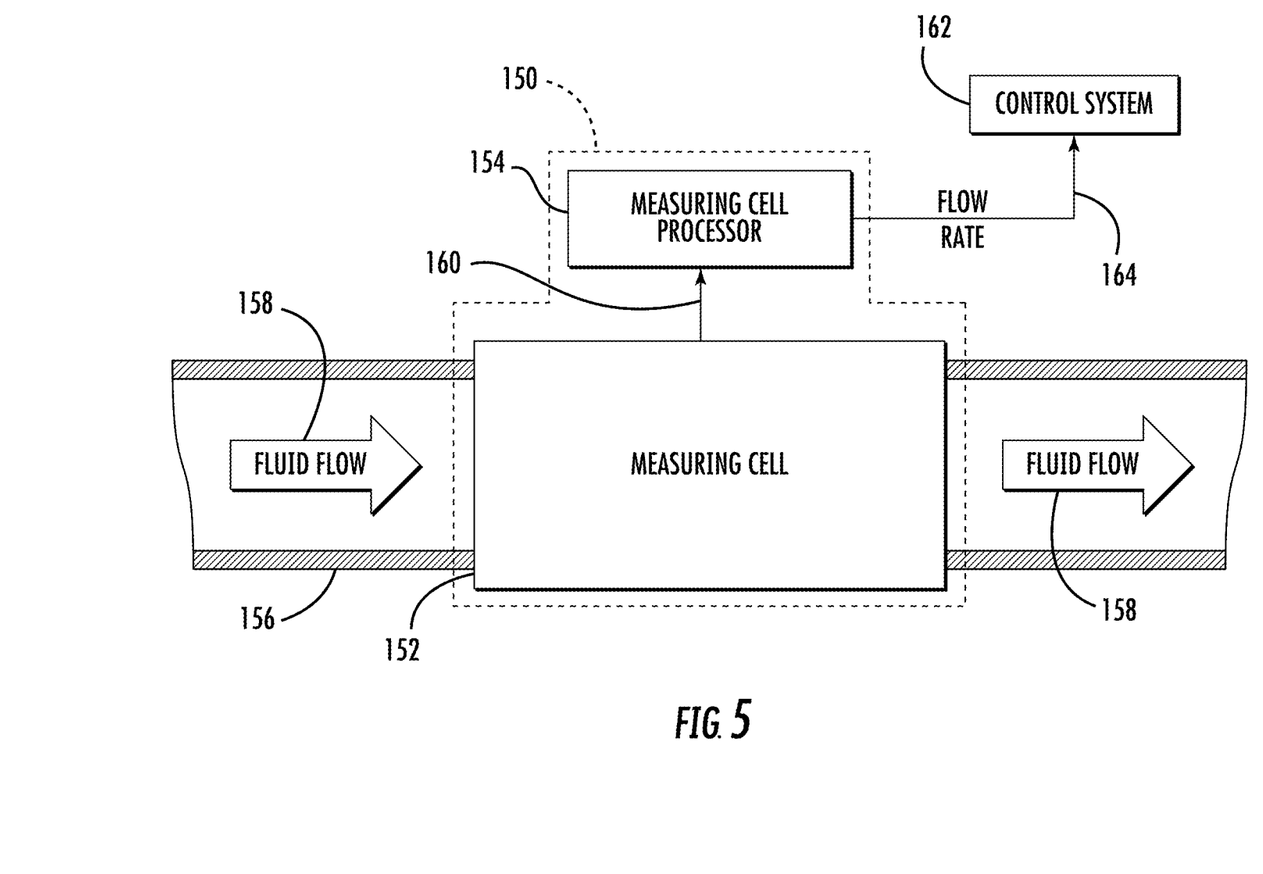
FIG. 5 is a system level schematic diagram of a flow meter according to one embodiment of the present invention.

An embodiment of the flow meter of the present invention will be described in more detail in reference to FIGS. 5-6. First, FIG. 5 is a partial side view of a system level schematic diagram of a flow meter 150 according to one embodiment of the present invention. Flow meter 150, generally indicated by a broken line, may comprise a measuring cell 152 and a measuring cell processor 154. Flow meter 150 may be coupled in line with fluid conduit 156, through which the fluid to be measured, indicated by arrows 158, flows.

As described in more detail below, measuring cell processor 154 may be in electronic communication with the measuring cell 152 to evaluate various characteristics of the second wave and the flow described above and thereby calculate the fluid's mass flow rate. Measuring cell processor 154 is preferably a digital signal processor (DSP) or the like capable of accurately correlating many signals in real time. In this case, communication occurs via data line 160, but those of skill in the art will appreciate that operative communication could occur via various wired and wireless methods, such as a local area network, wireless area network, or the like. Measuring cell processor 154 may preferably be located remote from measuring cell 152 in a suitable enclosure, such as a fuel dispenser electronics compartment. However, in other embodiments processor 154 may be directly coupled to the measuring cell 152 or in another suitable location.

Additionally, in many embodiments measuring cell processor 154 is in electrical communication with a control system 162 via data line 124. Control system 162, preferably in the form of a microprocessor located in the upper portion of a fuel dispenser housing, controls the operation of various gasoline dispenser components, such as valves, pumps, display electronics, and payment and transactional electronics. For example, control system 162 may correspond to control system 34 described above. Control system 162 may also be in electrical communication with a site controller or a remote network. Measuring cell processor 154 transmits calculated mass or volumetric flow rate information to control system 162 to enable control system 162 to calculate the precise quantity of fuel dispensed and the monetary amount a customer owes.

Figure 6:
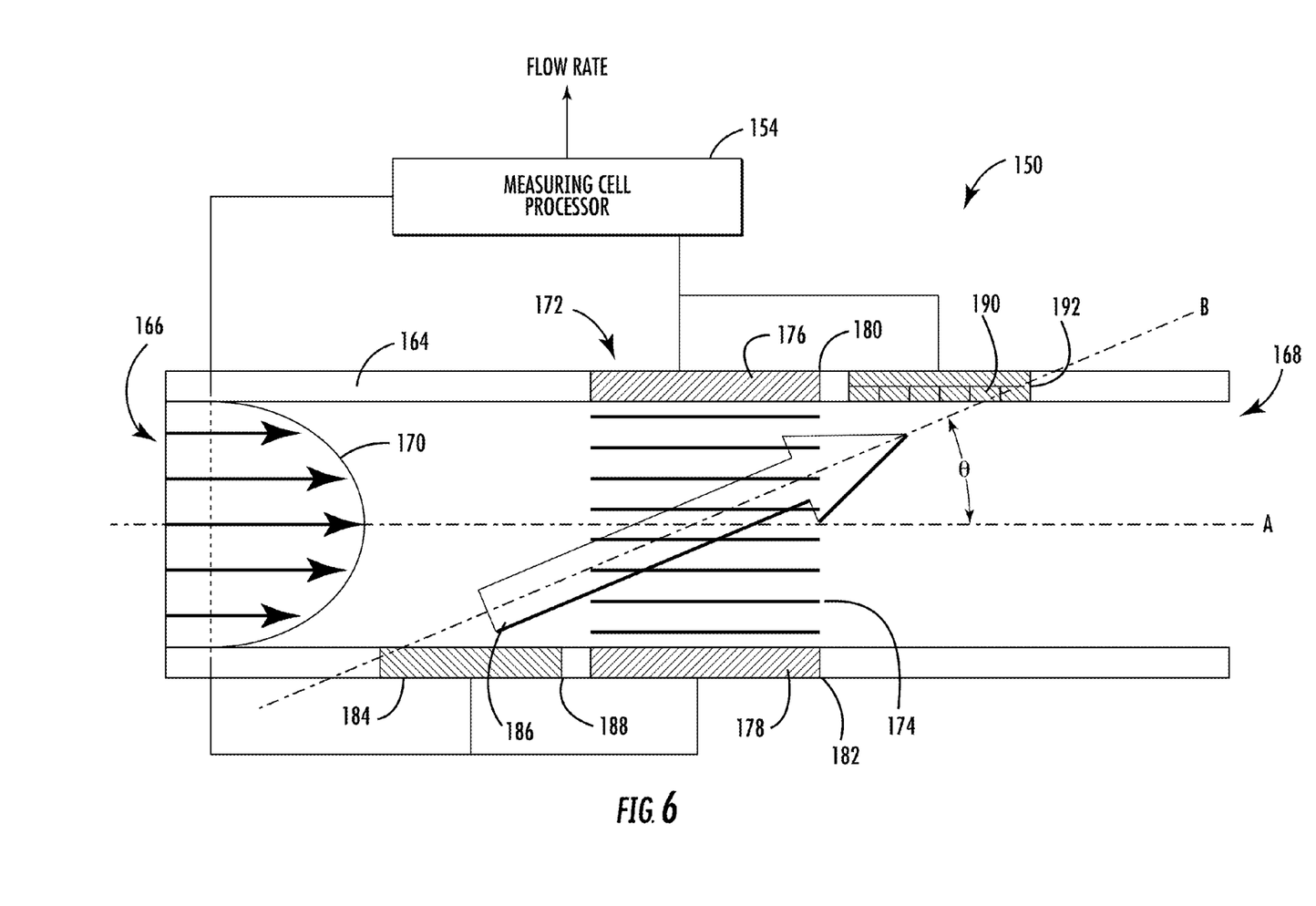
FIG. 6 is a top, schematic cross sectional view of the flow meter of FIG. 5.

FIG. 6 provides a top cross sectional diagrammatic view of a flow meter 150 according to an embodiment of the present invention. Meter 150 has housing 164 having inlet 166, outlet 168, and axis A along its centerline. Fluid to be measured (illustrated by flow profile 170) flows through the meter 150 from inlet 166 to outlet 168 with streamlines preferably parallel to axis A. As noted above, the fluid 170 is preferably a substantially steady, fully developed, laminar flow to facilitate accurate measurement. Those of skill in the art are familiar with suitable materials for housing 164. However, to facilitate mass flow rate measurement, in some embodiments housing 164 may be formed of a material having low roughness (such as glass or quartz). In the alternative, the interior of housing 164 may be lined with such a material.

An exciter 172 is provided in meter housing 164 to generate an acoustic wave 174, which may be planar as described above. In this embodiment, exciter 172 comprises two acoustic transducers 176, 178 provided opposite each other in meter housing 164 in ports 180, 182, respectively. Acoustic transducers 176, 178 may preferably be directly coupled with the fluid flow to each propagate an acoustic wave in opposite directions orthogonal to axis A and the fluid flow. Preferably, the two waves are sinusoidal with the same amplitude, frequency, and wavelength such that they sum to result in wave 174, which is a standing wave. Wave 174 induces a steady displacement of fluid particles per unit cycle time. However, in other embodiments exciter 172 could comprise one acoustic transducer to generate an acoustic wave that accelerates fluid molecules in generally reciprocating displacements in the direction of the acoustic wave's propagation. Acoustic wave 174 has a frequency $f_1$, which may be between 1 kHz and 20 kHz. Wave 174 may induce a displacement $\xi$ according to the relationship $\xi = P/$ ($2\pi f_1 Z$) in the fluid molecules where P is the pressure of the wave 174 and Z is the fluid's acoustic impedance.

Transducers 176, 178 are preferably magnetostriction drivers that may be made of nickel or aluminum. Alternatively, they could each comprise a piezoelectric disc or an acoustic vibratory node. Transducers 176, 178 comprise acoustic generators to provide the electrical signals that the transducers convert into acoustic waves. Measuring cell processor 154 may be in electronic communication with transducers 176, 178 to control their operation. Those of skill in the art will appreciate that in other embodiments transducers 176, 178 could comprise miniature, high-speed DC motors with eccentric rotors mounted on two shafts. In such a case the resulting wave would not be acoustic, but such motors have a good driving force and the principle of the invention would not change.

A second exciter 184 is also provided upstream of exciter 172 to generate a second wave 186. As described above and in more detail below, second wave 186 is preferably used to observe changes in the flow's velocity vector field as a result of disturbance by the first wave 174. Exciter 184 preferably comprises an ultrasonic transducer such that second wave 186 is an ultrasonic wave. In many embodiments, exciter 184 may preferably be similar to ultrasonic transducers found in known ultrasonic flow meters. Thus, wave 186 has a frequency $f_2$ which may be between 20 kHz and 0.5 MHz. The transducer of exciter 184 also is preferably a wetted transducer that is flush-mounted in meter housing 164 through a port 188. However, those of skill in the art are aware that it may be desirable for exciter 184 to be non-wetted (e.g., to reduce turbulence or increase strength) and thus exciter 184 may be mounted in a recess in housing 164 or on the exterior of housing 164 as needed or desired. Also, wave 186 preferably travels at an angle θ to axis A along or parallel to axis B. Angle θ can be in the range of zero (0) to ninety (90) degrees, but θ may preferably be 45 degrees.

In addition, a sensor array 190 comprising a plurality of sensors is provided downstream of exciter 172. Sensor array 190 may be flush-mounted in meter housing 164 through a port 192. Sensor array 190 preferably comprises at least two types of sensors. First, in a preferred embodiment sensor array 190 may comprise one or more high resolution ultrasonic sensors to detect characteristics of second wave 186, such as frequency and intensity. The ultrasonic sensors may preferably be adapted to calculate the instantaneous velocity of the fluid at multiple points. Additionally, in preferred embodiments the ultrasonic sensors may be less than 3 mm in diameter, and may be implemented as MEMS. Those of skill in the art will be able to select suitable sensors that are commercially available.

Second, sensor array 190 may preferably comprise high resolution pressure sensors to calculate the pressure created by the Coriolis force acting on the displaced fluid. Because they will be sensing highly dynamic pressures, the pressure sensors in sensor array 190 may preferably be piezoelectric. As with the ultrasonic sensors, the pressure sensors are commercially available and can be selected by those of skill in the art. Further, the pressure sensors are typically similar in size to the ultrasonic sensors and may also preferably be implemented as MEMS.

Because second wave 186 may be at a much higher frequency than the first wave 174, the ultrasonic sensors in sensor array 190 can take many measurements of flow velocity vectors at multiple positions as the first wave 174 oscillates through one cycle. Thus, the sensor array can determine the incremental change in the flow's velocity profile of the fluid induced by the first wave's oscillation.

Additionally, the pressure sensors in the sensor array 190 may dynamically detect changes in pressure over their area caused by the oscillation of the fluid by the first wave. The sensor array 190 sends these signals to measuring cell processor 154, which calculates the angular velocity Ω and the Coriolis force $F_c$. Using those variables and the relationships described above, the measuring cell processor calculates the mass flow rate of the fluid.

Figure 7:
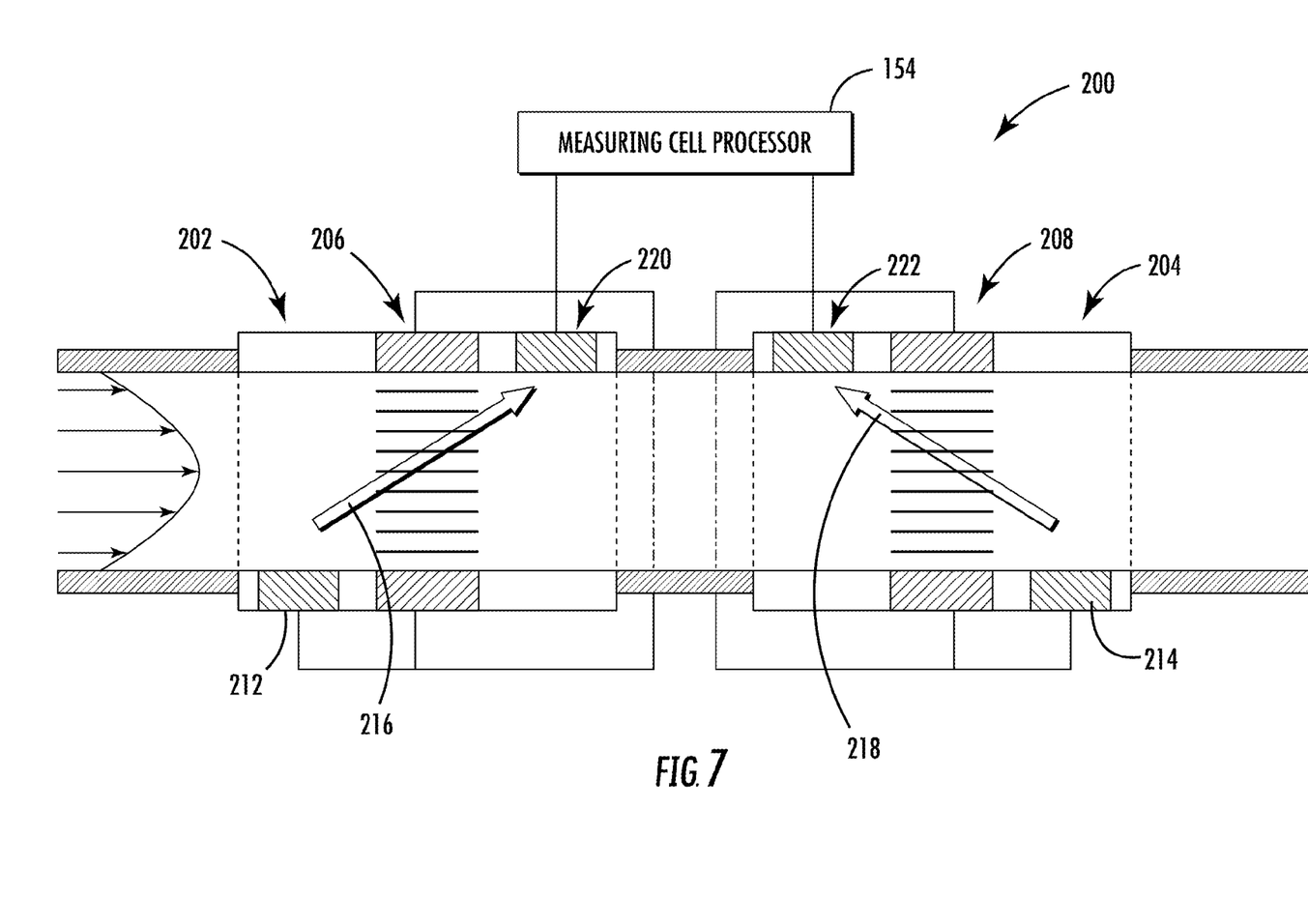
FIG. 7 is a side, schematic cross sectional view of an alternative embodiment of a flow meter comprising two measuring cells.

Although the flow meter of the present invention is highly accurate, for some applications it may be desirable to increase its accuracy. In this regard, FIG. 7 shows an alternative embodiment of a flow meter 200 comprising two measuring cells 202, 204. Here each measuring cell 202, 204 comprises an exciter 206, 208, respectively. Exciters 206, 208 each comprise two acoustic transducers as described above to generate a plane acoustic wave. However, in this case exciter 208 generates an acoustic wave with a phase opposite to that generated by exciter 206. Measuring cell processor 154 is in electronic communication with measuring cells 202, 204 and exciters 206, 208 to provide electronic control.

Additionally, measuring cells 202, 204 each comprise a second exciter 212, 214, respectively, to generate a second wave 216, 218 as described above. However, in this example second exciter 214 is provided downstream of first exciter 208 and generates the second wave 218 in a direction opposite second wave 216. Those of skill in the art are aware that many ultrasonic flow meters have a first set of transducers to determine flow velocity and also have a second set of transducers that generate an ultrasonic wave in the opposite direction to improve accuracy. Thus, an embodiment having two measuring cells would utilize known techniques to improve the accuracy of flow velocity measurements.

Each measuring cell 202, 204 comprises a sensor array 220, 222 as described above. The ultrasonic sensors in each sensor array collect velocity vector field data to determine angular velocity. Measuring cell processor 154 compares the pressure measurements by the pressure sensors of the sensor arrays to improve accuracy of the measurement of the Coriolis force.

While one or more preferred embodiments of the invention have been described above, it should be understood that any and all equivalent realizations of the present invention are included within the scope and spirit thereof. The embodiments depicted are presented by way of example only and are not intended as limitations upon the present invention. Thus, it should be understood by those of ordinary skill in this art that the present invention is not limited to these embodiments since modifications can be made. Therefore, it is contemplated that any and all such embodiments are included in the present invention as may fall within the scope and spirit thereof.

What is claimed is:

1. A fuel dispenser comprising:
   a fuel nozzle configured to be connected to a vehicle fuel system;
   fuel piping configured to transfer fuel from at least one fuel storage tank associated with the fuel dispenser through the fuel nozzle into the vehicle fuel system;
   a flow control valve located along said fuel piping; and
   a flow measurement device located along said fuel piping having a housing defining a flow path therethrough, said flow measurement device including:
   i. a first exciter for producing a first wave in fuel moving along said flow path;

ii. a second exciter for producing a second wave in said fuel which passes through said first wave, wherein said second wave has a higher frequency than said first wave;

iii. at least one sensor spaced apart from said first exciter and said second exciter, said at least one sensor being configured to detect at least one measurable characteristic of said second wave from which flow rate can be derived.

2. The fuel dispenser as set forth in claim 1, wherein said first exciter produces said first wave to have a frequency of between approximately 1 KHz to 20 KHz.

3. The fuel dispenser as set forth in claim 2, wherein said second exciter produces said second wave to have a frequency of at least approximately 20 KHz.

4. The fuel dispenser as set forth in claim 3, wherein said second exciter produces said second wave to have a frequency of between approximately 1 KHz and 20 KHz.

5. The fuel dispenser as set forth in claim 1, wherein said first exciter produces said first wave to be orthogonal to an axial direction of said flow path.

6. The fuel dispenser as set forth in claim 5, wherein said first exciter comprises a pair of diametrically opposed exciters located across said flow path.

7. The fuel dispenser as set forth in claim 6, wherein said pair of diametrically opposed exciters produce said first wave as a standing wave.

8. The fuel dispenser as set forth in claim 5, wherein said first exciter comprises one of a magnetostriction driver, a piezoelectric disc, and an acoustic vibratory node.

9. The fuel dispenser as set forth in claim 3, wherein said second exciter comprises an ultrasonic transducer.

10. The fuel dispenser as set forth in claim 1, wherein said at least one sensor comprises a sensor array.

11. The fuel dispenser as set forth in claim 1, wherein said sensor array includes at least one ultrasonic sensor and at least one pressure sensor.

12. The fuel dispenser as set forth in claim 1, wherein said at least one sensor is located downstream of said first exciter and said second exciter.

13. The fuel dispenser as set forth in claim 12, wherein said second exciter is located upstream of said first exciter.

14. A flow measurement device for determining the mass flow rate of a fluid flowing in a conduit, said flow measurement device comprising:

a first exciter for producing a first wave in said fluid;

a second exciter for producing a second wave in said fluid passing through said first wave, wherein said second wave has a higher frequency than said first wave;

wherein said first wave causes a change in at least one measurable characteristic of said second wave;

a sensor array spaced apart from said first exciter and said second exciter, said sensor array being configured to detect said at least one measurable characteristic of said second wave; and a processor in electronic communication with said sensor array to receive signals representative of said at least one measurable characteristic of said second wave, said processor configured to calculate the mass flow rate of said fluid.

15. The flow measurement device as set forth in claim 14, wherein said sensor array comprises at least one pressure sensor to detect alterations in the pressure of said fluid caused by inertial forces acting on said fluid.

16. The flow measurement device as set forth in claim 14, wherein said first exciter produces said first wave to have a frequency of between approximately 1 KHz to 20 KHz.

17. The flow measurement device as set forth in claim 16, wherein said second exciter produces said second wave to have a frequency of at least approximately 20 KHz.

18. The flow measurement device as set forth in claim 17, wherein said second exciter produces said second wave to have a frequency of between approximately 1 KHz and 20 KHz.

19. The flow measurement device as set forth in claim 14, wherein said first exciter produces said first wave to be orthogonal to an axial direction of flow of said fluid.

20. The flow measurement device as set forth in claim 19, wherein said first exciter comprises a pair of diametrically opposed exciters located across said axial direction of said flow of said fluid.

21. The flow measurement device as set forth in claim 20, wherein said pair of diametrically opposed exciters produce said first wave as a standing wave.

22. The flow measurement device as set forth in claim 21, wherein said first exciter comprises one of a magnetostriction driver, a piezoelectric disc, and an acoustic vibratory node.

23. The flow measurement device as set forth in claim 17, wherein said second exciter comprises an ultrasonic transducer.

24. The flow measurement device as set forth in claim 14, wherein said sensor array includes at least one ultrasonic sensor and at least one pressure sensor.

25. The flow measurement device as set forth in claim 14, wherein said second exciter is located upstream of said first exciter.

* * * * *